July 11, 1939. C. J. SCHNEIDER 2,165,417
FRUIT GIRTH
Filed Jan. 27, 1938
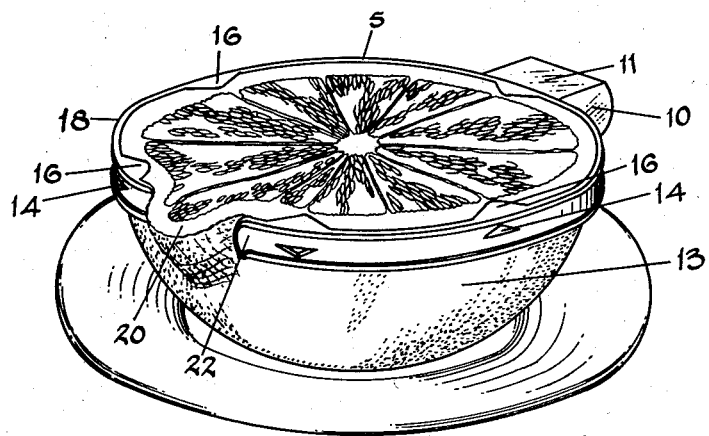
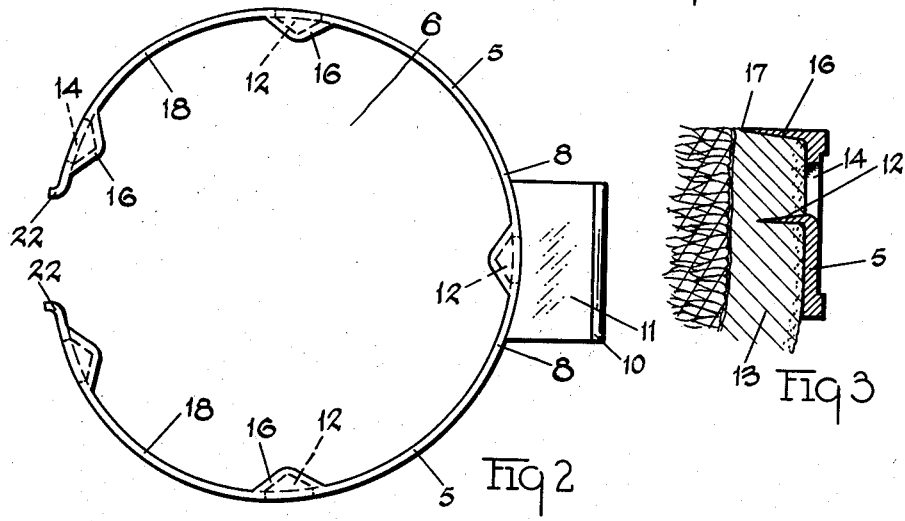
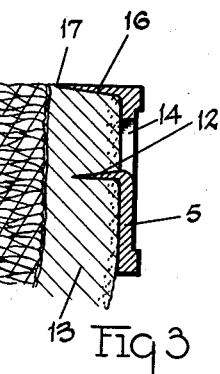
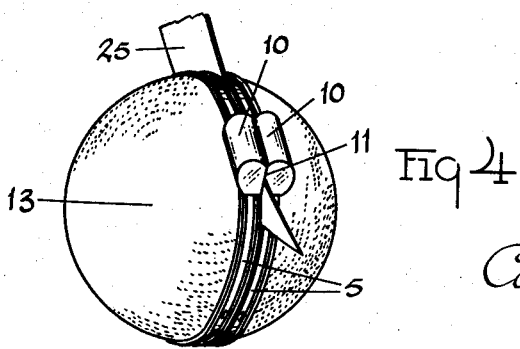
Inventor
Cale J. Schneider
By (signature)
Attorney Patented July 11, 1939

2,165,417

UNITED STATES PATENT OFFICE 2,165,417

FRUIT GIRTH

Cale J. Schneider, Toledo, Ohio

Application January 27, 1938, Serial No. 187,279

2 Claims. (Cl. 294—33)

My invention relates generally to the epicurean arts and provides a table utensil fundamentally for the polite manipulation of food during the consumption thereof. The invention particularly relates to a device having an inherent aesthetic appearance that may be girded on a serving of fruit and provide a manually seizable means for cooperative manipulation thereof with a serving utensil, such as a spoon, fork, et cetera.

The invention has for an object to provide a fruit girth having girding means that may be located in embracing relation to a fruit or portion thereof together with a manually graspable handle element, connected to said girding means, whereby the embraced fruit may be manipulated. Another object of the invention is to provide a fruit girth having a plurality of fruit spanning or embracing arms to which a handle is connected, each arm being yieldably and angularly movable, with respect to the handle and each other, about a defined and localized point located in proximity to the handle, thus to enable the arms to embrace fruit of varying sizes. In this connection, my invention has for a further object to provide an end element or portion extending from one or both of said arms, in an angular relation to the spanning direction of said arm, to accommodate the fruit girth in embracing fruit bodies of a dimension less than the arm span, without rendering the fruit girth incapable of embracing fruit bodies of an equal or greater dimension than said span. The provision of said end portion, therefore, renders the fruit girth adaptable to gird fruit of a considerable variety.

A further object of the invention is to provide a fruit girth having arms adapted to span or embrace fruit, the arms being provided with impaling means, one of said impaling means disposed in spaced relation to the other along a line extending transverse of said arm. In the provision of said impaling means thus related, the fruit embraced by said arms is firmly held against, not only endwise or translatory movement, but also angular or oscillatory movement relative to the arms, a feature of marked importance where the fruit girth is adaptable and intended to be associated with fruit of varying bodily form and dimension. Another object of the invention is to provide a fruit girth having a pair of arms adapted to embrace fruit, each of said arms provided with a plurality of flattened teeth disposed in a plane common to each other and to that of one of the major surfaces of the other teeth together with a plurality of flattened clips disposed in a plane common to each other and to that of one of the major surfaces of said clips but spaced from the plane of the teeth, the teeth and clips being insertable into the fruit body on embracement thereof by the arms.

A still further object of my invention is to provide a fruit girth having a pair of interconnected arcuate arms, from each of which extends an element opposite to the like element of the other arm and which conjointly form a means for engaging and pinching a portion of the fruit embraced by said arms to produce, by said engagement, an outwardly extending spout over which fluids contained within the fruit may be poured. Said elements in their related pinching engagement of said fruit portions also form means for further insuring interconnection between the fruit and the arms of the fruit girth.

The invention consists in other features and advantages which will appear from the following description and upon examination of the drawing. Structures containing the invention may partake of different forms and still embody the invention. To illustrate a practical application of the invention, I have selected a fruit girth as an example of the various structures and details thereof that contain the invention and shall describe the selected structures hereinafter, it being understood that variations may be made without departing from the spirit of the invention. The particular structure selected is shown in the accompanying drawing and described hereinafter.

Fig. 1 of the accompanying drawing, illustrates a perspective view of the fruit girth selected for purposes of illustration, being shown in assembled relation with a fruit body. Fig. 2 illustrates a plan view of the fruit girth shown in Fig. 1. Fig. 3 illustrates a view of a transverse section of a part of the fruit girth shown in Fig. 1, as the same appears in assembled relation to a fruit body. Fig. 4 illustrates a perspective view of a pair of fruit girths in assembled relation to a fruit body.

The fruit girth selected for purposes of illustrating an embodiment of my invention has a pair of fruit spanning or embracing interconnected arcuate arms 5. Each arm 5 extends in an opposite direction and in a plane common to the other arm 5 to define, substantially, a partial cyclo-enclosure 6 therebetween. Preferably, the arc defined by each arm 5 has a common axis so that both arms 5 conjointly define a true hemicycle. Further, it is my preference that each arm be formed from relatively stiff band metal so as to be practically unyielding throughout the active fruit embracing length thereof.

In order to provide for angular movement of the arms with respect to each other to embrace fruit bodies of dimensions larger than enclosure 6, means is provided for permitting said angular movement of each arm about a determined localized point. In the form of construction illustrated in the accompanying drawing, each arm 5 is subject to suitable tempering or like methods whereby a resilient characteristic is imparted to a portion, indicated at 8, of each arm. Thus, it will be appreciated that each arm may be bodily moved angularly, but with a yielding resistance thereto, about the portion 8 to accommodate the arms for embracement of fruit bodies of dimensions somewhat greater than that of the partial cyclo-enclosure 6 defined by said arms.

For ease of manipulation of the fruit girth and, consequently, such fruit as may be embraced by the arms 5 thereof, a manually graspable element is connected to said arms. As shown in the accompanying drawing, the said graspable element is embodied in a handle 10. The handle 10 is, preferably, connected to each of the arms 5 at a point so as to locate the same intermediate the portions 8 of the two arms 5. Thus, not only may the arms be moved angularly, with respect to each other, but also with respect to the handle 10 to facilitate locating the handle so that it may extend radially, and thus opportunely, with respect to the axis of a fruit body embraced by said arms. The handle 10 may be composed from a moldable plastic, to which suitable and decorative color and design may be imparted. A material known to the trade as "catalin" may be utilized to form the handle in any desired useful and/or aesthetic shape. Preferably, for reasons hereinafter discussed, the handle 10 has a surface 11 of such configuration which, when located in juxtaposition to a like surface 11 of another handle 10, interfits therewith.

To connect the arms to a fruit body, such as the hemispherical portion of a grapefruit 13, illustrated in Fig. 1 of the drawing, impaling means adapted to engage the fruit are provided on the arms 5. One of said impaling means may be embodied in a plurality of teeth 12. Each tooth 12 is preferably of a flattened shaped and disposed so that planes of the two major surfaces thereof extend parallel to the plane through which the tooth's associated arm arcuately extends. Thus, the insertion of the teeth into the fruit body becomes a component movement of the general movement necessary to install the arms in embracing relation about the fruit body and the teeth enter the fruit body with a slicing action rather than by puncture. Those skilled in the art will appreciate the extent to which this arrangement facilitates interconnection of the fruit with the embracing arms.

Each tooth 12 may be formed by die-cutting and bending a triangular portion of the arm 5 inwardly with respect to the enclosure 6 defined by the arm. In thus forming a plurality of teeth 12, a plurality of triangular shaped openings 14 will be formed in the arm 5 through which the fruit body may be observed to produce a pleasing recurrent design on the arm 5 in the color of the fruit body when assembled therewith. Preferably, the teeth 12 are disposed on their respective arm 5 so that each of the two major surfaces, namely, the upper surface and lower surface, when viewed as illustrated in Fig. 2 of the drawing, of each tooth is located in a plane common to that of a like surface of the other teeth.

A second impaling means adapted to engage the fruit body 13 to connect the same to the arms 5 may be embodied in a plurality of clips 16. Like the teeth 12, each of the clips 16 is preferably of a flattened shape and disposed so that the planes of the two major surfaces thereof, namely, the upper surface and lower surface, when viewed as illustrated in Fig. 2 of the drawing, extend parallel to the plane through which the clip's associated arm 5 arcuately extends, to obtain the same advantages of facilitated installation discussed in connection with said teeth.

Each clip 16 is preferably formed by providing the associated arm 5 with an edge tab extension having a relatively sharpened edge 17 and bending said tab inwardly with respect to the enclosure 6 defined by said arm. By thus forming the clips 16, it will be observed that the two major surfaces of each clip are each located in a plane common to that of a like surface of the other of the clips and spaced from each plane common to each of the two major surfaces of the teeth 12. As shown in the accompanying drawing, each major surface plane of the clips 16 is in parallel relation to each major surface plane of the teeth 12. Therefore, as portrayed in Fig. 3 of the accompanying drawing, wherein the arm 5 is shown in associated relation to a fruit body 13, each tooth 12 will engage the fruit body at one point and each clip 16 will also engage the fruit body at another point, vertically spaced from the plane of engagement by the teeth 12. The fruit body will, consequently, be held against oscillatory movement as well as translatory movement with respect to arms 5.

An element is provided on each arm 5 and extends in an angular relation to the arcuate direction through which the arm projects to effect embracement of fruit bodies whose dimension is less than that of enclosure 6 defined by the arms 5. Said element may be embodied in an arcuate end portion 18 which extends from each arm 5. The axis of the arc defined by said end portion 18 is spaced from the axis of the arc defined by said arms 5 and, preferably, is more proximate to the point of connection of the handle 10 to the arms 5. The end portions 18, therefore, conjointly define a hemicycle having a different axis than the hemicycle defined by the arms 5 to complete the partial cyclo-enclosure 6 and thus to clamp a fruit body of a lesser diamension between the end portions 18 and arms 5 and also aid in the interlocking of the arms to the fruit body.

Said end portions 18 also form means adapted to engage a portion of the fruit body to urge said fruit portion to form a spout, as shown at 20, in Fig. 1 of the accompanying drawing, over which the liquid contained in the fruit body may be poured. In this connection, the end portions 18 terminate in spaced relation to each other and may have terminals 22 which curl outwardly to direct and urge the fruit portion to form said spout as the fruit girth is installed about the hemispherical fruit body. The terminals 22 tend to pinch the fruit portion into the formation of the spout and, consequently, aid in the interlocking of the arms to the fruit body. As the pulp of the fruit body is removed from the skin or rind during consumption, the resistance exerted within the fruit body to the formation of the spout decreases. Thus, when all or most of the pulp has been removed, the rind will have been forced to form a very satisfactory spout 20 over which the fruit juice may be poured by grasping the handle 10 and effecting a tilting of the fruit body thereby.

If desired, the end portions 18 may be provided with teeth 12 and clips 16 in the same manner and relation as described in connection with the arms 5. Further, if desired, the fruit girth may be installed prior to partitioning the fruit, in which case, it is suggested that a pair of fruit girths be assembled on the fruit, as shown in Fig. 4 of the accompanying drawing. The utility of the surface 11 of the handle 10 becomes apparent here, as when the two fruit girths are associated on an unpartitioned fruit body, the handles thereof interfit along the juxtaposed surfaces 11 thereof to form a single graspable handle by means of which the fruit body may be manipulated during partitioning, as by the knife blade 25. It will be further appreciated that the clips 16 form guideways serving the knife blade 25 to direct same into and through the fruit body.

It will be appreciated that a fruit girth embodying my invention may be used in conjunction with various foods and fruits, as well as with the illustrated grapefruit. While in accordance with the provisions of the statutes, I have illustrated and described the best form of my invention now known to me, those skilled in the art will readily understand that many changes may be made in the form of construction disclosed, without departing from the spirit of my invention as set forth in the appended claims.

I claim:

1. A fruit girth having a handle part, a pair of relatively rigid arcuate arms connected to the handle part, each arm extending in an opposite direction and in a plane common to each other to define substantially a hemicycle therebetween, each of said arms having an arcuate end portion, the end portions conjointly defining substantially a second hemicycle therebetween whose axis is spaced from the axis of the first-named hemicycle and proximate to the handle connection, each end portion terminating a distance spaced from the terminal of the other end portion, a plurality of triangularly shaped teeth connected to and extending inwardly from each of said arms, each of said teeth disposed on its respective arm at spaced points on a line common to the plane of the teeth and parallel to the plane through which the arm arcs, a plurality of bladelike clips connected to and extending inwardly from each of said arms, each of said clips disposed on its respective arm at spaced points on a straight line common to the plane of the clips and extending along said arm parallel to said first-named line, each of said arms having portions adjacent said handle connection permitting yielding movement of each arm with respect to the handle connection and the other arm whereby a substantially hemispherical portion of a fruit may be yieldably embraced by said arms and be impaled conjointly by said teeth and clips to connect the handle to the fruit portion for ease of manipulation thereof and a part of said fruit will be urged outwardly with respect to said second-named hemicycle and between said end portion terminals to cooperate in connecting the handle to said fruit portion and to form a pouring spout for the contained liquids within the fruit.

2. A fruit girth having a handle part, a metal band connected to said handle part and bent to form a pair of arcuate arms extending in opposite directions and in a plane common to each other to define a substantially cyclo-enclosure therebetween, the metal band being bodily punched at spaced points to form a plurality of teeth integral with said band and extending from each of said arms inwardly with respect to said enclosure through a plane common to all of said teeth, a plurality of clips integral with said band formed on one edge of the metal band and bent to extend inwardly with respect to said enclosure from each of said arms through a plane common with the edge of the metal band from which the clips extend whereby a fruit of substantially spherical body may be embraced by said arms and be impaled conjointly by said teeth and clips to connect the handle to the fruit for ease of manipulation.

CALE J. SCHNEIDER.